United States Patent
Warkentin et al.

(10) Patent No.: US 12,360,794 B2
(45) Date of Patent: Jul. 15, 2025

(54) LIFECYCLE AND RECOVERY FOR VIRTUALIZED DPU MANAGEMENT OPERATING SYSTEMS

(71) Applicant: VMware LLC, Palo Alto, CA (US)

(72) Inventors: Andrei Warkentin, South Elgin, IL (US); Sunil Kotian, San Jose, CA (US); Ye Li, Newton Highlands, MA (US); Cyprien Laplace, Boston, MA (US); Regis Duchesne, Monts-de-Corsier (CH); Alexander Fainkichen, Southborough, MA (US); Shruthi Hiriyuru, Medford, MA (US)

(73) Assignee: VMware LLC, Palo Alto, CA (US)

( * ) Notice: Subject to any disclaimer, the term of this patent is extended or adjusted under 35 U.S.C. 154(b) by 546 days.

(21) Appl. No.: 17/715,292

(22) Filed: Apr. 7, 2022

(65) Prior Publication Data

US 2023/0325222 A1 Oct. 12, 2023

(51) Int. Cl.
*G06F 9/455* (2018.01)

(52) U.S. Cl.
CPC ...... *G06F 9/45558* (2013.01); *G06F 9/45533* (2013.01); *G06F 2009/4557* (2013.01); *G06F 2009/45595* (2013.01)

(58) Field of Classification Search
None
See application file for complete search history.

(56) References Cited

U.S. PATENT DOCUMENTS

| | | | | |
|---|---|---|---|---|
| 9,055,386 | B2* | 6/2015 | Evans | G06F 9/45541 |
| 2008/0276235 | A1* | 11/2008 | Knauerhase | G06F 9/4881 |
| | | | | 718/1 |
| 2011/0154325 | A1* | 6/2011 | Terasaki | G06F 21/53 |
| | | | | 718/1 |
| 2011/0202917 | A1* | 8/2011 | Laor | G06F 9/45558 |
| | | | | 718/1 |
| 2011/0307715 | A1* | 12/2011 | Diab | H04L 12/12 |
| | | | | 718/1 |
| 2015/0106803 | A1* | 4/2015 | Srivastava | G06F 9/45533 |
| | | | | 718/1 |
| 2015/0371042 | A1* | 12/2015 | Mooring | G06F 21/56 |
| | | | | 726/1 |
| 2017/0262306 | A1* | 9/2017 | Wang | G06F 9/5027 |
| 2021/0200573 | A1* | 7/2021 | Cao | G06F 13/28 |

* cited by examiner

*Primary Examiner* — Abu Zar Ghaffari
(74) *Attorney, Agent, or Firm* — King Intellectual Asset Management

(57) ABSTRACT

Disclosed are various examples of lifecycle and recovery management for virtualized data processing unit (DPU) management operating systems. A DPU device executes a DPU management hypervisor that communicates with a management service over a network. The DPU management hypervisor virtualizes DPU hardware resources and passes control of the virtualized DPU hardware resources to a DPU management operating system (OS) virtual machine (VM). The DPU management hypervisor maintains control of a management network interface card (NIC) of the DPU device.

20 Claims, 4 Drawing Sheets

LIFECYCLE AND RECOVERY FOR VIRTUALIZED DPU MANAGEMENT OPERATING SYSTEMS

BACKGROUND

Enterprises can employ a management service that uses virtualization to provide the enterprise with access to software, data, and other resources. The management service use host devices to execute workloads that provide software services for enterprise activities. The enterprises can use other host devices to access these workloads.

Data processing units (DPUs) can be physically installed to host devices. These DPUs can include processors, a network interface, and in many cases can include acceleration engines capable of machine learning, networking, storage, and artificial intelligence processing. The DPUs can include processing, networking, storage, and accelerator hardware. However, DPUs can be made by a wide variety of manufacturers. The interface and general operation can differ from DPU to DPU.

This can pose problems for management services and enterprises that desire to fully utilize the capabilities of DPUs in host devices. There is a need for better mechanisms that can integrate DPUs into a virtualization and management solution.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to lifecycle and recovery management for virtualized data processing unit (DPU) management operating systems. A DPU can be physically installed to a host device. The DPU can include processors, a network interface, and in many cases can include acceleration engines capable of machine learning, networking, storage, and artificial intelligence processing. However, DPUs can be made by a wide variety of manufacturers. The interface and general operation can differ from DPU to DPU.

This can pose problems for management services and enterprises that desire to fully utilize the capabilities of DPUs in host devices. DPU devices can be vertically integrated solutions, with a tight coupling of custom hardware and manufacturer or vendor-specific software. The DPU hardware has no requirement to be built to a particular standard. DPU devices can use off-the-shelf IP circuit blocks for flash memories, Universal Asynchronous Receiver/Transmitter (UART) devices, peripheral component interconnect express (PCIe) devices, and others. Some of the circuit blocks used for DPU devices can cause driver problems from their relatively lower industry adoption rate.

A DPU management operating system image that is used as a replacement operating system for multiple different DPUs can require many customized drivers and other specialized code for each supported DPU. The present disclosure provides mechanisms that can launch a DPU management operating system virtual machine using a DPU management hypervisor executed as firmware or privileged microcode of the DPU device. This enables advance lifecycle management and recovery of the DPU management operating system in the virtual machine.

Figure 1:
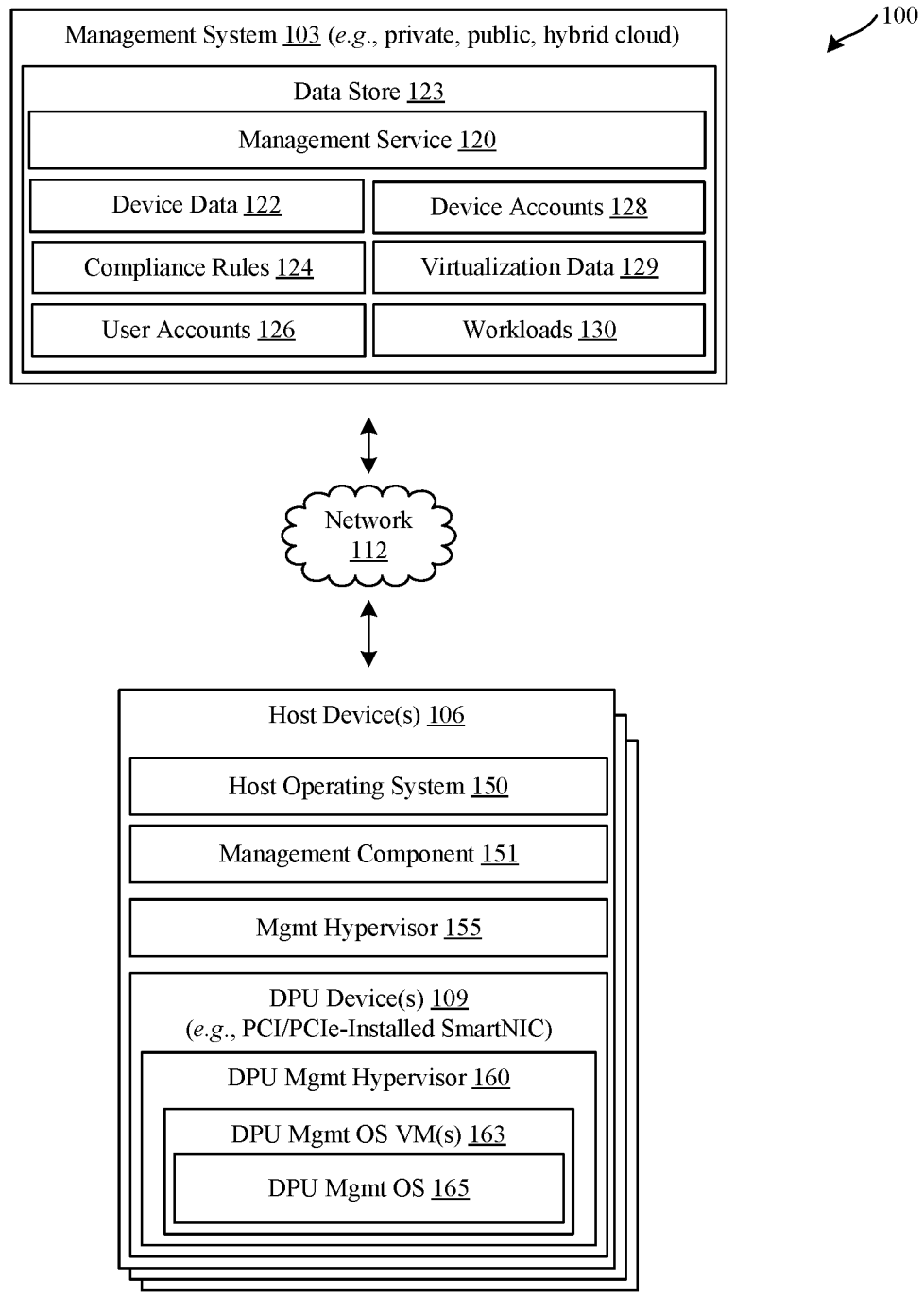
FIG. 1 is a drawing of an example of a networked environment that includes components that enable lifecycle and recovery management for virtualized data processing unit (DPU) management operating systems, according to the present disclosure.

With reference to FIG. 1, shown is an example of a networked environment 100. The networked environment 100 can include a management system 103, host devices 106, and other components in communication with one another over a network 112. DPU devices 109 can be installed to the host devices 106. In some cases, host devices 106 can include computing devices or server computing devices of a private cloud, public cloud, hybrid cloud, and multi-cloud infrastructures. Hybrid cloud infrastructures can include public and private host computing devices. Multi-cloud infrastructures can include multiple different computing platforms from one or more service providers in order to perform a vast array of enterprise tasks.

The host devices 106 can also include devices that can connect to the network 112 directly or through an edge device or gateway. The components of the networked environment 100 can be utilized to provide virtualization solutions for an enterprise. The hardware of the host devices 106 can include physical memory, physical processors, physical data storage, and physical network resources that can be utilized by virtual machines. Host devices 106 can also include peripheral components such as the DPU devices 109. The host devices 106 can include physical memory, physical processors, physical data storage, and physical network resources. Virtual memory, virtual processors, virtual data storage, and virtual network resources of a virtual machine can be mapped to physical memory, physical processors, physical data storage, and physical network resources of the host devices 106. The management hypervisor 155 can provide access to the physical memory, physical processors, physical data storage, and physical network resources of the host devices 106 to perform workloads 130.

The DPU devices 109 can include networking accelerator devices, smart network interface cards, or other cards that are installed as a peripheral component. The DPU devices 109 themselves can also include physical memory, physical processors, physical data storage, and physical network resources. The DPU devices 109 can also include specialized physical hardware that includes accelerator engines for machine learning, networking, storage, and artificial intelligence processing. Virtual memory, virtual processors, virtual data storage, and virtual network resources of a virtual machine can be mapped to physical memory, physical processors, physical data storage, physical network resources, and physical accelerator resources of the DPU devices 109.

The DPU management operating system 165 can communicate with the management hypervisor 155 and/or with the management service 120 directly to provide access to the physical memory, physical processors, physical data storage, physical network resources, and physical accelerator resources of the DPU devices 109. However, the DPU management operating system 165 may not be initially installed to the DPU device 109.

Virtual devices including virtual machines, containers, and other virtualization components can be used to execute the workloads 130. The workloads 130 can be managed by the management service 120 for an enterprise that employs the management service 120. Some workloads 130 can be initiated and accessed by enterprise users through client devices. The virtualization data 129 can include a record of the virtual devices, as well as the host devices 106 and DPU devices 109 that are mapped to the virtual devices. The virtualization data 129 can also include a record of the workloads 130 that are executed by the virtual devices.

The network 112 can include the Internet, intranets, extranets, wide area networks (WANs), local area networks (LANs), wired networks, wireless networks, other suitable networks, or any combination of two or more such networks. The networks can include satellite networks, cable networks, Ethernet networks, telephony networks, and other types of networks.

The management system 103 can include one or more host or server computers, and any other system providing computing capability. In some examples, a subset of the host devices 106 can provide the hardware for the management system 103. While referred to in the singular, the management system 103 can include a plurality of computing devices that are arranged in one or more server banks, computer banks, or other arrangements. The management system 103 can include a grid computing resource or any other distributed computing arrangement. The management system 103 can be multi-tenant, providing virtualization and management of workloads 130 for multiple different enterprises. Alternatively, the management system 103 can be customer or enterprise-specific.

The computing devices of the management system 103 can be located in a single installation or can be distributed among many different geographical locations which can be local and/or remote from the other components. The management system 103 can also include or be operated as one or more virtualized computer instances. For purposes of convenience, the management system 103 is referred to herein in the singular. Even though the management system 103 is referred to in the singular, it is understood that a plurality of management systems 103 can be employed in the various arrangements as described above.

The components executed on the management system 103 can include a management service 120, as well as other applications, services, processes, systems, engines, or functionality not discussed in detail herein. The management service 120 can be stored in the data store 123 of the management system 103. While referred to generally as the management service 120 herein, the various functionalities and operations discussed can be provided using a management service 120 that includes a scheduling service and a number of software components that operate in concert to provide compute, memory, network, and data storage for enterprise workloads and data. The management service 120 can also provide access to the enterprise workloads and data executed by the host devices 106 and can be accessed using client devices that can be enrolled in association with a user account 126 and related credentials.

The management service 120 can communicate with associated management instructions executed by host devices 106, client devices, edge devices, and IoT devices to ensure that these devices comply with their respective compliance rules 124, whether the specific host device 106 is used for computational or access purposes. If the host devices 106 or client devices fail to comply with the compliance rules 124, the respective management instructions can perform remedial actions including discontinuing access to and processing of workloads 130.

The data store 123 can include any storage device or medium that can contain, store, or maintain the instructions, logic, or applications described herein for use by or in connection with the instruction execution system. The data store 123 can be a hard drive or disk of a host, server computer, or any other system providing storage capability. While referred to in the singular, the data store 123 can include a plurality of storage devices that are arranged in one or more hosts, server banks, computer banks, or other arrangements. The data store 123 can include any one of many physical media, such as magnetic, optical, or semiconductor media. More specific examples include solid-state drives or flash drives. The data store 123 can include a data store 123 of the management system 103, mass storage resources of the management system 103, or any other storage resources on which data can be stored by the management system 103. The data store 123 can also include memories such as RAM used by the management system 103. The RAM can include static RAM (SRAM), dynamic RAM (DRAM), synchronous DRAM (SDRAM), and other types of RAM.

The data stored in the data store 123 can include management data including device data 122, enterprise data, compliance rules 124, user accounts 126, and device accounts 128, as well as other data. Device data 122 can identify host devices 106 by one or more device identifiers, a unique device identifier (UDID), a media access control (MAC) address, an internet protocol (IP) address, or another identifier that uniquely identifies a device with respect to other devices.

The device data 122 can include an enrollment status indicating whether a computing device, including a DPU device, is enrolled with or managed by the management service 120. For example, an end-user device, an edge device, IoT device, host device 106, client device, or other devices can be designated as "enrolled" and can be permitted to access the enterprise workloads and data hosted by host devices 106, while those designated as "not enrolled," or having no designation, can be denied access to the enterprise resources. The device data 122 can further include indications of the state of IoT devices, edge devices, end user devices, host devices 106, DPU devices 109 and other devices. For example, the device data 122 can indicate that a host device 106 includes a DPU device 109 that has a DPU management operating system 165 installed. This can enable providing remotely-hosted management services to the host device 106 through or using the DPU device 109. This can also include providing management services 120 to other remotely-located client or host devices 106 using resources of the DPU device 109. While a user account 126 can be associated with a particular person as well as client devices, a device account 128 can be unassociated with any particular person, and can nevertheless be utilized for an IoT device, edge device, or another client device that provides automatic functionalities.

Device data 122 can also include data pertaining to user groups. An administrator can specify one or more of the host devices 106 as belonging to a user group. The user group can refer to a group of user accounts 126, which can include device accounts 128. User groups can be created by an administrator of the management service 120.

Compliance rules 124 can include, for example, configurable criteria that must be satisfied for the host devices 106, DPU devices 109, and other devices to be in compliance with the management service 120. The compliance rules 124 can be based on a number of factors, including geographical location, activation status, enrollment status, and authentication data, including authentication data obtained by a device registration system, time, and date, and network properties, among other factors associated with each device. The compliance rules 124 can also be determined based on a user account 126 associated with a user.

Compliance rules 124 can include predefined constraints that must be met in order for the management service 120, or other applications, to permit host devices 106 and other devices access to enterprise data and other functions of the management service 120. The management service 120 can communicate with management instructions on the client device to determine whether states exist on the client device which do not satisfy one or more of the compliance rules 124. States can include, for example, a virus or malware being detected; installation or execution of a blacklisted application; and/or a device being "rooted" or "jailbroken," where root access is provided to a user of the device. Additional states can include the presence of particular files, questionable device configurations, vulnerable versions of applications, vulnerable states of the client devices or other vulnerability, as can be appreciated. While the client devices can be discussed as user devices that access or initiate workloads 130 that are executed by the host devices 106, all types of devices discussed herein can also execute virtualization components and provide hardware used to host workloads 130.

The management service 120 can oversee the management and resource scheduling using hardware provided using host devices 106 and DPU devices 109. The management service 120 can oversee the management and resource scheduling of services that are provided to the host devices 106 and DPU devices 109 using remotely located hardware. The management service 120 can transmit various software components, including enterprise workloads, enterprise data, and other enterprise resources for processing and storage using the various host devices 106. The host devices 106 can include host devices 106 such as a server computer or any other system providing computing capability, including those that compose the management system 103. Host devices 106 can include public, private, hybrid cloud and multi-cloud devices that are operated by third parties with respect to the management service 120. The host devices 106 can be located in a single installation or can be distributed among many different geographical locations which can be local and/or remote from the other components.

The host devices 106 can include DPU devices 109 that are connected to the host device 106 through a universal serial bus (USB) connection, a Peripheral Component Interconnect Express (PCI-e) or mini-PCI-e connection, or another physical connection. DPU devices 109 can include hardware accelerator devices specialized to perform artificial neural networks, machine vision, machine learning, and other types of special purpose instructions written using CUDA, OpenCL, C++, and other instructions. The DPU devices 109 can utilize in-memory processing, low-precision arithmetic, and other types of techniques. The DPU devices 109 can have hardware including a network interface controller (NIC), CPUs, data storage devices, memory devices, and accelerator devices.

The management service 120 can include a scheduling service that monitors resource usage of the host devices 106, and particularly the host devices 106 that execute enterprise workloads 130. The management service 120 can also track resource usage of DPU devices 109 that are installed on the host devices 106. The management service 120 can track the resource usage of DPU devices 109 in association with the host devices 106 to which they are installed. The management service 120 can also track the resource usage of DPU devices 109 separately from the host devices 106 to which they are installed.

In some examples, the DPU devices 109 can execute workloads 130 assigned to execute on host devices 106 to which they are installed. For example, the management hypervisor 155 can communicate with a DPU management operating system 165 to offload all or a subset of a particular workload 130 to be performed using the hardware resources of a DPU device 109. Alternatively, the DPU devices 109 can execute workloads 130 assigned, by the management service 120, specifically to the DPU device 109 or to a virtual device that includes the hardware resources of a DPU device 109. In some examples, the management service 120 can communicate directly with the DPU management operating system 165, and in other examples the management service 120 can use the management hypervisor 155 to communicate with the DPU management operating system 165. The management service 120 can use DPU devices 109 to provide the host device 106 with access to workloads 130 executed using the hardware resources of another host device 106 or DPU device 109.

The host device 106 can execute instructions including a host operating system 150, a management component 151 and a management hypervisor 155. The DPU device 109 can execute instructions including a proprietary DPU provider operating system 161, a DPU management operating system virtual machine 163, and a DPU management operating system 165.

The host operating system 150 can include an operating system that provides a user interface and an environment for applications and other instructions executed by the host device 106. The host operating system 150 can include any operating system. In some examples, the host operating system 150 can include a server operating system such as Windows Server® or another operating system for server computers.

The management component 151 can communicate with the management service 120 for scheduling of workloads 130 executed using virtual resources that are mapped to the physical resources of one or more host device 106. The management component 151 can communicate with the management hypervisor 155 to deploy virtual devices that perform the workloads 130. In various embodiments, the management component 151 can be separate from, or a component of, the management hypervisor 155. The management component 151 can additionally or alternatively be installed to the DPU device 109. The management component 151 of a DPU device 109 can be separate from, or a component of, the DPU management operating system 165.

The management hypervisor 155 can include a bare metal or type 1 hypervisor that can provide access to the physical memory, physical processors, physical data storage, and physical network resources of the host devices 106 to perform workloads 130. A management hypervisor 155 can create, configure, reconfigure, and remove virtual machines and other virtual devices on a host device 106. The management hypervisor 155 can also relay instructions from the management service 120 to the DPU management operating system 165. In other cases, the management service 120 can communicate with the DPU management operating system 165 directly. The management hypervisor 155 can identify that a workload 130 or a portion of a workload 130 includes instructions that can be executed using the DPU device 109, and can offload these instructions to the DPU device 109.

The DPU management hypervisor 160 can be a hypervisor that is booted as firmware or privileged microcode of the DPU device 109. The DPU management hypervisor 160 can operate at exception level 2 (EL2) or exception level 3 (EL3) of the DPU device 109. The DPU management hypervisor 160 can provide access to the physical memory, physical processors, physical data storage, physical ASICs, physical network resources, and other DPU hardware resources 203 of the DPU device 109. The DPU management hypervisor 160 can create, configure, reconfigure, and remove virtual machines and other virtual devices on a DPU device 109. The DPU management hypervisor 160 can also include a virtual machine manager that can communicate with a proxy virtual machine manager of the DPU management operating system virtual machine 163 or DPU management operating system 165. The proxy virtual machine manager can launch virtualized functions nested within the DPU management operating system virtual machine 163. Virtualized functions can include virtual network functions, management functions, other types of functions and workloads 130 that are executed in virtual machines or containers. The DPU management hypervisor 160 can relay communications between the management service 120 and the DPU management operating system 165 that are transmitted through certain network interfaces such as a management network interface card (NIC) or management interface device of the DPU device 109.

The DPU management operating system virtual machine 163 can include a virtual machine that executes the DPU management operating system 165. The DPU management operating system virtual machine 163 can access DPU hardware resources using virtualization facilities provided by the DPU management hypervisor 160. The DPU management operating system virtual machine 163 can include a privileged virtual machine that operates at a kernel level and has access to kernel level privileges of the DPU device 109.

The DPU management operating system 165 can include a management-service-specific operating system that enables the management service 120 to manage the DPU device 109 and assign workloads 130 to execute using its resources. The DPU management operating system 165 can communicate with the DPU management hypervisor 160, the management component 151, the management hypervisor 155 and/or with the management service 120 directly to provide access to the physical memory, physical processors, physical data storage, physical network resources, and physical accelerator resources of the DPU devices 109.

Figure 2:
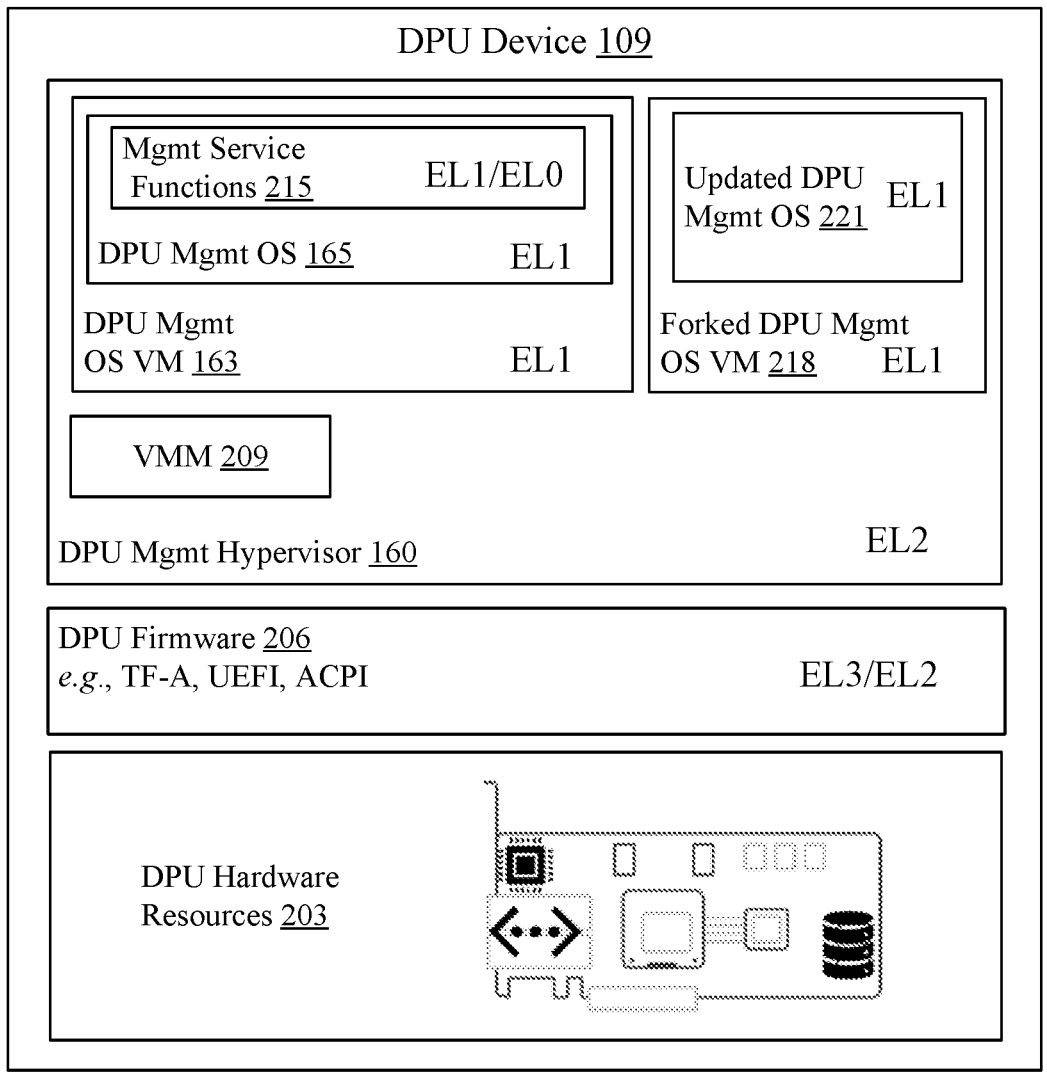
FIG. 2 is a drawing that illustrates aspects of lifecycle and recovery management for virtualized DPU management operating systems of a DPU device, according to the present disclosure.

FIG. 2 shows an example of a DPU device 109 that launches a DPU management operating system virtual machine 163 using a DPU management hypervisor 160 executed as firmware or kernel privileged microcode of the DPU device 109. The DPU device 109 can include DPU hardware resources 203, DPU firmware 206, a DPU management hypervisor 160, and a DPU management operating system virtual machine 163.

The DPU hardware resources 203 can include a main processor such as an ARM processor or another RISC-based processor, one or more memory including flash, Non-Volatile Memory Express (NVMe) devices, and other memory devices. The DPU hardware resources 203 can include special-purpose DPU ASICs including network interface card (NIC) ASICs, network processing units (NPU) ASICs, field programmable gate array (FPGA) based ASICs, software switches, Programming Protocol-independent Packet Processors (P4) devices, NVIDIA® ConnectX®-6 Dx (CX6) devices, and others. The DPU hardware resources 203 can be virtualized using kernel-space OS stack DPU virtualization.

The DPU firmware 206 can include Trusted Firmware A (TF-A), Unified Extensible Firmware Interface (UEFI) or another publicly available specification that defines a software interface, Advanced Configuration and Power Interface (ACPI), a power management specification, or another power management firmware, and other firmware for the DPU device 109.

The DPU management hypervisor 160 can be a hypervisor that is booted as firmware or privileged microcode of the DPU device 109. In this example, the DPU management hypervisor 160 can operate at exception level 2 (EL2) of the DPU device 109. The DPU management hypervisor 160 can provide access to the physical memory, physical processors, physical data storage, physical ASICs, physical network resources, and other DPU hardware resources 203 of the DPU device 109. The DPU management hypervisor 160 can create, configure, reconfigure, and remove virtual machines and other virtual devices on a DPU device 109. The DPU management hypervisor 160 can also include a virtual machine manager 209 that can create a DPU management operating system virtual machine 163 on startup, boot, or power cycle of the DPU device 109.

The DPU management operating system virtual machine 163 can include a virtual machine that executes the DPU management operating system 165. The DPU management operating system virtual machine 163 can access DPU hardware resources 203 using virtualization facilities provided by the DPU management hypervisor 160. The DPU management operating system virtual machine 163 can include a privileged virtual machine that operates at a kernel level and has access to kernel level privileges of the DPU device 109.

The DPU management operating system virtual machine 163 can include a virtual machine that executes the DPU management operating system 165. DPU management operating system virtual machine 163 can also include SBBR firmware that includes hardware access and power management firmware such as UEFI and ACPI.

The DPU management operating system 165 can include a management-service-specific operating system that enables the management service 120 to manage the DPU device 109 and assign workloads 130 to execute using its resources. The components of the DPU management operating system 165 can be compiled to run in EL1. This can include using EL1 variants over EL2 variants for system registers pertaining to MMU, system control, exception handling, generic timer, and interrupt control.

The DPU management operating system 165 can include management service functions 215. The DPU management operating system 165 can operate in EL1 mode, or kernel level mode, rather than EL2 mode. Exception levels (e.g., EL0, EL1, EL2, EL3) can correspond to Advanced RISC Machine (ARM) privilege levels. EL0 can refer to application mode or user space privilege, EL1 can refer to kernel space or rich operating system privilege, EL2 can refer to hypervisor privilege, and EL3 can refer to firmware kernel space privilege level. The discussion can include reference to exception levels since some DPU devices 109 can include ARM processors as a main processor. However, other DPU devices 109 can include other processor types and privilege levels corresponding to other labels and designations.

The management service functions 215 can include functionalities that are different from the DPU provider functions. The management service functions 215 can perform management-service-developed network, compute, storage, artificial intelligence, machine learning, management, security, and other types of functionalities that are designed by the management service 120. In some examples, the management service functions 215 can include native functionalities of the DPU device 109 that are imported, translated, or modified to be invoked using the DPU management operating system 165. The DPU management operating system 165 can include or provide endpoints through which the management service functions 215 can be invoked for use. The DPU management operating system 165 can also check in with the management service 120 or a management component of the host device 106, and retrieve a command to perform a management service function 215.

The DPU management hypervisor 160 and its virtual machine manager 209 can also update the DPU management operating system 165 while minimizing downtime. For example, the DPU management hypervisor 160 can cause the DPU management operating system virtual machine 163 fork into a forked DPU management operating system virtual machine 218.

In some examples, the forked DPU management operating system virtual machine 218 can initially have the same DPU management operating system 165 as the DPU management operating system virtual machine 163. The DPU management hypervisor 160 can cause an update to be applied that updates the DPU management operating system 165 to the updated DPU management operating system 221. Alternatively, a new virtual machine can be launched that includes the updated DPU management operating system 221 based on a bootable image. Once the new or forked virtual machine includes the fully updated DPU management operating system 221, I/O control can be passed to the updated DPU management operating system 221. Since control is passed between two functional virtual machines, the update process includes far less downtime than traditional updates for DPU devices 109. No matter how long the update process takes, the downtime is limited to the time required to change I/O and control between the virtual machines.

Executing the DPU management operating system virtual machine 163 enables fast booting, or booting with lower startup time than a traditional solution. A checkpoint or snapshot can be taken at a full clean boot. On reboot, the DPU management operating system virtual machine 163 can be restored to the most recent checkpoint or another desired checkpoint.

Figure 3:
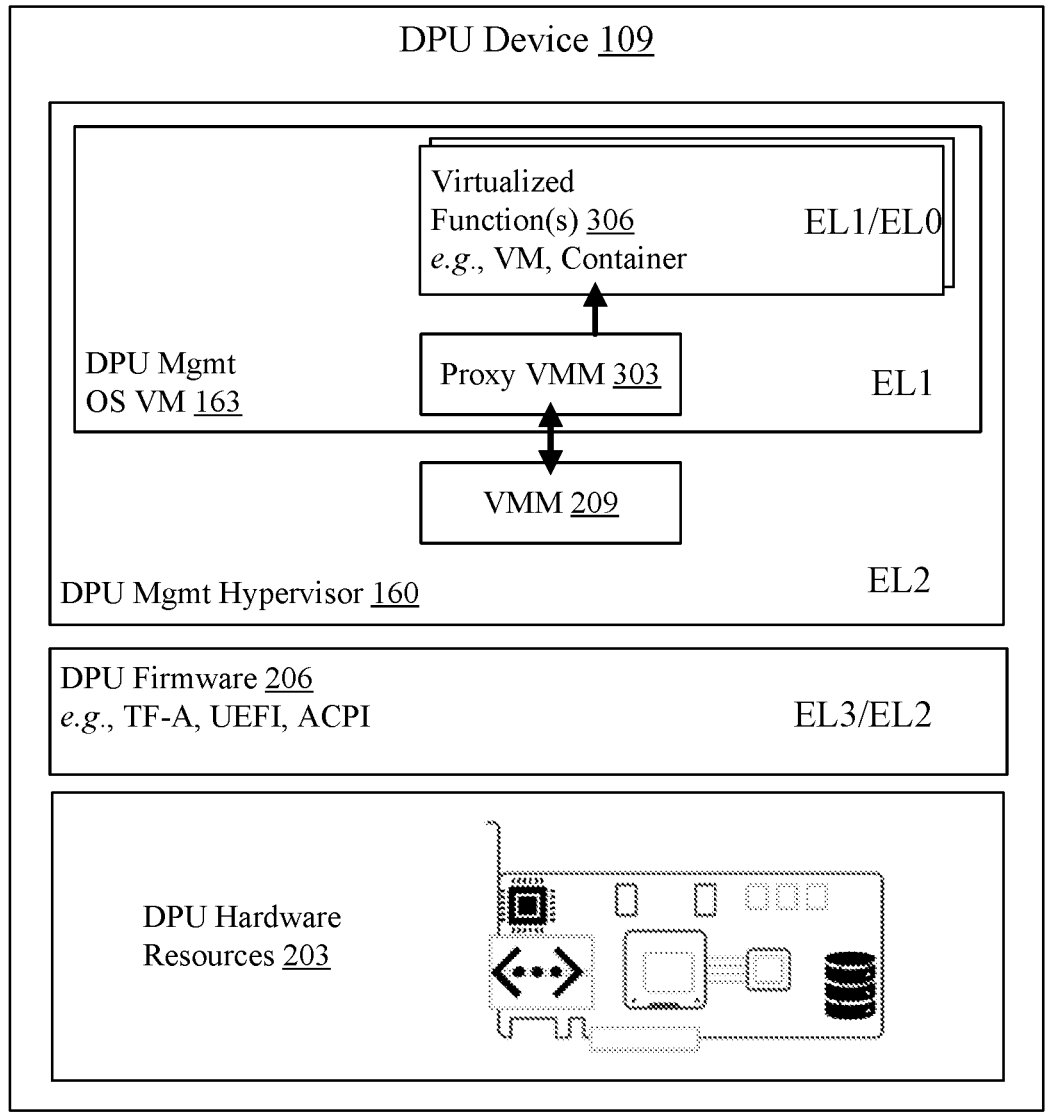
FIG. 3 is a drawing that illustrates additional aspects of lifecycle and recovery management for virtualized DPU management operating systems of a DPU device, according to the present disclosure.

FIG. 3 shows another example of a DPU device 109 that launches a DPU management operating system virtual machine 163 using a DPU management hypervisor 160 executed as firmware or kernel privileged microcode of the DPU device 109. The DPU device 109 can include DPU hardware resources 203, DPU firmware 206, a DPU management hypervisor 160, and a DPU management operating system virtual machine 163. Generally, this figure shows how the architecture can enable virtualization in a DPU device 109 that natively lacks nested virtualization abilities.

The DPU management hypervisor 160 can include a virtual machine manager 209 that can create a DPU management operating system virtual machine 163 on startup, boot, or power cycle of the DPU device 109. The virtual machine manager 209 can also communicate with a proxy virtual machine manager 303 of the DPU management operating system virtual machine 163 or DPU management operating system 165. The proxy virtual machine manager 303 can launch virtualized functions 306 within the DPU management operating system virtual machine 163. Virtualized functions 306 can include management service functions 215, virtual network functions, and other types of functions and workloads 130. The virtualized functions 306 can be executed in virtual machines or containers. The containers can include Kubernetes®, Docker®, and other containers. The virtual machine manager 209 can communicate with the proxy virtual machine manager 303 using private hypervisor API (hypercall) mechanism provided by the DPU management hypervisor 160.

Figure 4:
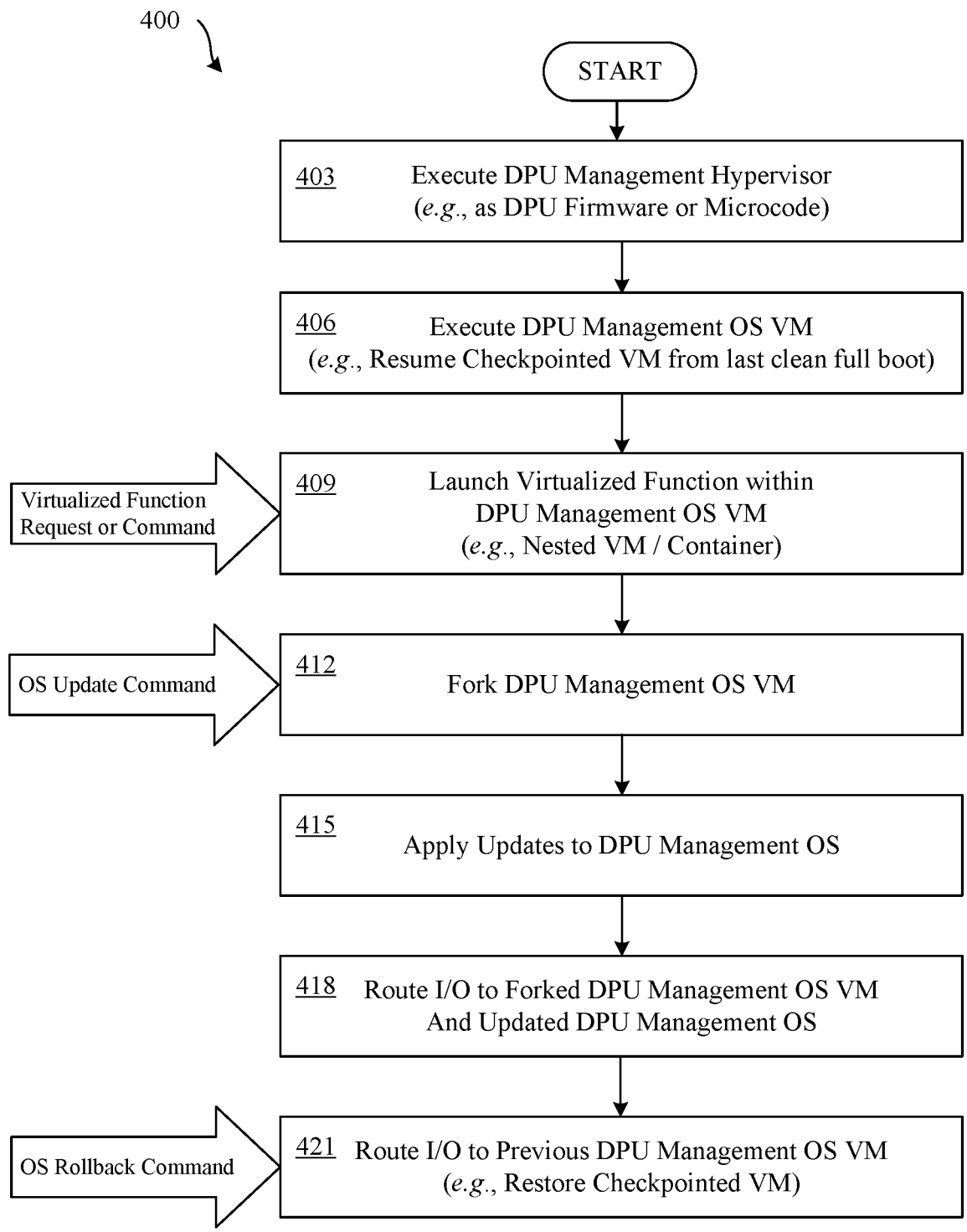
FIG. 4 is a flowchart illustrating functionality implemented by components of the networked environment, according to the present disclosure.

FIG. 4 shows a flowchart 400 that provides an example of the operation of components of the networked environment 100. While a particular step can be discussed as being performed by a particular hardware or software component of the networked environment 100, other components can perform aspects of that step.

In step 403, the DPU device 109 can execute a DPU management hypervisor 160. The DPU management hypervisor 160 can be executed directly by the DPU device 109. The DPU management hypervisor 160 can be a low-overhead hypervisor in data size and usage of DPU hardware resources 203. The DPU management hypervisor 160 can be designed to execute on DPU devices 109 and to virtualize the main processor, memory, and data storage as well as the specialized DPU hardware resources 203 including ASICs and other hardware components that perform networking, artificial intelligence, machine learning, graphics, and other functionalities specific to DPU devices 109.

The DPU management hypervisor 160 can own or have direct control over a DPU local data storage device and management network interface. The DPU management operating system 165 can have control over advanced I/O facilities and functionalities, ASICs, NVMe, in collaboration with the DPU management hypervisor 160. The DPU management hypervisor 160 can provide the DPU management operating system 165 with control of these resources using single root I/O virtualization (SR-IOV), DVX, or paravirtualization. The DPU management operating system virtual machine 163 can have its I/O usage quiesced or brought into a state suitable for backups. The DPU management operating system virtual machine 163 can also checkpoint state data for resuming on the same DPU device 109 or migration of the DPU management operating system virtual machine 163 to another DPU device 109. The checkpoint state data and I/O usage data can be transmitted to the management service 120 and provided to another DPU device 109 on command, or can be transferred directly to another DPU device 109 on command.

In step 406, the DPU device 109 can execute the DPU management operating system virtual machine 163. The DPU management operating system virtual machine 163 can be executed along with the DPU management operating system 165 on boot, startup, or power cycle of the DPU device 109. This can include resuming a checkpointed DPU management operating system virtual machine 163 from a clean full boot.

In step 409, the DPU device 109 can launch a virtualized function 306 from the DPU management operating system virtual machine 163. The DPU management hypervisor 160 can receive or retrieve a command to perform the virtualized function 306. The DPU management hypervisor 160 can receive or retrieve the request from the management service 120. The DPU management hypervisor 160 can use its virtual machine manager 209 to command the proxy virtual machine manager of the DPU management operating system 165 to launch a virtual machine, container, or other virtualization environment to perform the virtualized function 306.

The DPU management operating system 165 can receive or retrieve a command to perform a management service function 215, and then launch and perform the requested management service function 215. In some cases, the DPU management hypervisor 160 can relay communications between the management service 120 and the DPU management operating system 165 that are transmitted through certain network interfaces such as a management network interface of the DPU device 109. A management service function 215 can be executed in a virtual machine or container as a virtualized function 306.

In step 412, the DPU device 109 can fork the DPU management operating system virtual machine 163. The DPU management hypervisor 160 can receive a request to update the DPU management operating system 165. In order to update the DPU management operating system 165 without interrupting usage of the DPU device 109, the DPU management hypervisor 160 can fork the DPU management operating system virtual machine 163. This can result in a forked DPU management operating system virtual machine 218.

In step 415, the DPU device 109 can apply updates to the DPU management operating system 165 in the forked DPU management operating system virtual machine 218. The forked DPU management operating system virtual machine 218 can initially have the same DPU management operating system 165 as the DPU management operating system virtual machine 163. The DPU management hypervisor 160 can cause an update to be applied that updates the DPU management operating system 165 to the updated DPU management operating system 221.

In step 418, the DPU device 109 can route I/O and hardware control to the forked DPU management operating system virtual machine 218 and the updated DPU management operating system 221. Once the update is completed, the DPU management hypervisor 160 can receive a transmission, perform a test, or otherwise receive identification that the update is completed and the updated DPU management operating system 221 is ready. Once the update is completed and the updated DPU management operating system 221 is ready, the DPU management hypervisor 160 can route I/O and hardware control to the updated DPU management operating system 221.

In step 421, in response to receiving an operating system rollback command, the DPU management hypervisor 160 can route I/O and hardware control to the previous DPU management operating system 165 of the previous DPU management operating system virtual machine 163. For example, the DPU management hypervisor 160 can restore a checkpointed virtual machine corresponding to the previous DPU management operating system virtual machine 163 or another desired checkpointed state.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory devices can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

Although the various services and functions described herein can be embodied in software or code executed by general purpose hardware as discussed above, as an alternative, the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The sequence diagrams and flowcharts can show examples of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or another system. The machine code can be converted from the source code. If embodied in hardware, each block can represent a circuit or a number of interconnected circuits to implement the specified logical function(s).

Although sequence diagrams and flowcharts can be shown in a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the drawings can be skipped or omitted.

Also, any logic or application described herein that includes software or code can be embodied in any non-transitory computer-readable medium for use by or in connection with an instruction execution system such as a processor in a computer system or another system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described embodiments of the present disclosure are merely possible examples of implementations described for a clear understanding of the principles of the disclosure. Many variations and modifications can be made to the above-described embodiments without departing substantially from the spirit and principles of the disclosure. All such modifications and variations are intended to be included in the following claims herein, within the scope of this disclosure.

Therefore, the following is claimed:

1. A non-transitory computer-readable medium comprising executable instructions, wherein the instructions, when executed by at least one processor, cause at least one computing device to at least:
   execute, by a data processing unit (DPU) device, a DPU hypervisor, wherein the DPU hypervisor runs on the DPU, communicates with a management service over a network, and virtualizes a subset of DPU hardware resources of the DPU device;
   transfer, by the DPU hypervisor, control of the virtualized subset of the DPU hardware resources to a DPU operating system (OS) virtual machine (VM), wherein the DPU hypervisor maintains control of a network interface card (NIC) of the DPU device;
   receive, by the DPU device, a command to perform a functionality using at least one of the DPU hardware resources; and
   perform, by the DPU OS VM, the functionality using the virtualized subset of the DPU hardware resources, wherein the functionality is performed by launching a virtual machine or a container within the DPU OS VM, and wherein the DPU hypervisor comprises a virtual machine manager that communicates with a proxy virtual machine manager within the DPU OS VM, and the proxy virtual machine manager launches the virtual machine or the container within the DPU OS VM.

2. The non-transitory computer-readable medium of claim 1, wherein the virtualized subset of the DPU hardware resources comprises at least one of: a networking hardware component, an artificial intelligence hardware component, a machine learning hardware component, or a graphics hardware component.

3. The non-transitory computer-readable medium of claim 1, wherein the DPU hypervisor transfers control of the virtualized subset of the DPU hardware resources using single root input output (I/O) virtualization (SR-IOV) or paravirtualization.

4. The non-transitory computer-readable medium of claim 1, wherein the DPU hypervisor is booted as firmware or privileged microcode of the DPU device.

5. The non-transitory computer-readable medium of claim 1, wherein the command is received from the management service.

6. The non-transitory computer-readable medium of claim 1, wherein the functionality comprises at least one of a networking functionality, an artificial intelligence functionality, machine learning functionality, or a graphics functionality.

7. The non-transitory computer-readable medium of claim 1, wherein the instructions, when executed by the at least one processor, cause the at least one computing device to at least:
   receive, by the DPU hypervisor, an update command to update a DPU OS of the DPU OS VM;
   fork, by the DPU hypervisor, the DPU OS VM to create a forked DPU OS VM;
   update a forked instance of the DPU OS in the forked DPU OS VM to an updated DPU OS; and
   transfer, by the DPU hypervisor, control of the virtualized subset of the DPU hardware resources to the updated DPU OS in the forked DPU OS VM.

8. A system, comprising:
   at least one computing device comprising at least one processor; and
   a data store comprising executable instructions, wherein the instructions, when executed by the at least one processor, cause the at least one computing device to at least:
      execute, by a data processing unit (DPU) device, a DPU hypervisor, wherein the DPU hypervisor runs on the DPU, communicates with a management service over a network, and virtualizes a subset of DPU hardware resources of the DPU device;
      transfer, by the DPU hypervisor, control of the virtualized subset of the DPU hardware resources to a DPU operating system (OS) virtual machine (VM), wherein the DPU hypervisor maintains control of a network interface card (NIC) of the DPU device;
      receive, by the DPU device, a command to perform a functionality using at least one of the DPU hardware resources; and
      perform, by the DPU OS VM, the functionality using the virtualized subset of the DPU hardware resources, wherein the functionality is performed by launching a virtual machine or a container within the DPU OS VM, and wherein the DPU hypervisor comprises a virtual machine manager that communicates with a proxy virtual machine manager within the DPU OS VM, and the proxy virtual machine manager launches the virtual machine or the container within the DPU OS VM.

9. The system of claim 8, wherein the virtualized subset of the DPU hardware resources comprises at least one of: a networking hardware component, an artificial intelligence hardware component, a machine learning hardware component, or a graphics hardware component.

10. The system of claim 8, wherein the DPU transfers control of the virtualized subset of the DPU hardware resources using single root input output (I/O) virtualization (SR-IOV) or paravirtualization.

11. The system of claim 8, wherein the DPU hypervisor is booted as firmware or privileged microcode of the DPU device.

12. The system of claim 8, wherein the command is received from the management service.

13. The system of claim 8, wherein the functionality comprises at least one of a networking functionality, an artificial intelligence functionality, machine learning functionality, or a graphics functionality.

14. The system of claim 8, wherein the instructions, when executed by the at least one processor, cause the at least one computing device to at least:
    receive, by the DPU hypervisor, an update command to update a DPU OS of the DPU OS VM;
    fork, by the DPU hypervisor, the DPU OS VM to create a forked DPU OS VM;
    update a forked instance of the DPU OS in the forked DPU OS VM to an updated DPU OS; and
    transfer, by the DPU hypervisor, control of the virtualized subset of the DPU hardware resources to the updated DPU OS in the forked DPU OS VM.

15. A method, comprising:
    executing, by a data processing unit (DPU) device, a DPU hypervisor, wherein the DPU hypervisor runs on the DPU, communicates with a management service over a network, and virtualizes a subset of DPU hardware resources of the DPU device;
    transferring, by the DPU hypervisor, control of the virtualized subset of the DPU hardware resources to a DPU operating system (OS) virtual machine (VM), wherein the DPU hypervisor maintains control of a network interface card (NIC) of the DPU device;
    receiving, by the DPU device, a command to perform a functionality using at least one of the DPU hardware resources; and
    performing, by the DPU OS VM, the functionality using the virtualized subset of the DPU hardware resources, wherein the functionality is performed by launching a virtual machine or a container within the DPU OS VM, and wherein the DPU hypervisor comprises a virtual machine manager that communicates with a proxy virtual machine manager within the DPU OS VM, and the proxy virtual machine manager launches the virtual machine or the container within the DPU OS VM.

16. The method of claim 15, wherein the virtualized subset of the DPU hardware resources comprises at least one of: a networking hardware component, an artificial intelligence hardware component, a machine learning hardware component, or a graphics hardware component.

17. The method of claim 15, wherein the DPU hypervisor passes control of the virtualized subset of the DPU hardware resources using single root input output (I/O) virtualization (SR-IOV) or paravirtualization.

18. The method of claim 15, wherein the DPU hypervisor is booted as firmware or privileged microcode of the DPU device.

19. The method of claim 1, wherein the command is received from the management service.

20. The method of claim 15, further comprising:
    receiving, by the DPU hypervisor, an update command to update a DPU OS of the DPU OS VM;
    forking, by the DPUt hypervisor, the DPUt OS VM to create a forked DPUt OS VM;
    updating a forked instance of the DPUt OS in the forked DPU OS VM to an updated DPUt OS; and
    transferring, by the DPUt hypervisor, control of the virtualized subset of the DPU hardware resources to the updated DPUt OS in the forked DPUt OS VM.

\* \* \* \* \*